(12) United States Patent
Dutson

(10) Patent No.: US 6,464,614 B2
(45) Date of Patent: Oct. 15, 2002

(54) HYDRAULIC SUPPLY FOR INFINITELY VARIABLE TRANSMISSION

(75) Inventor: Brian Joseph Dutson, Tyldesley (GB)

(73) Assignee: Torotrak (Development) Limited, Preston (GB)

(*) Notice: Subject to any disclaimer, the term of this patent is extended or adjusted under 35 U.S.C. 154(b) by 0 days.

(21) Appl. No.: 09/758,374

(22) Filed: Jan. 12, 2001

(65) Prior Publication Data

US 2001/0001938 A1 May 31, 2001

Related U.S. Application Data

(63) Continuation of application No. PCT/GB99/02968, filed on Sep. 7, 1999.

(30) Foreign Application Priority Data

Sep. 11, 1998 (GB) .............................................. 9819903

(51) Int. Cl.⁷ .......................... F16H 15/38; F16H 57/02
(52) U.S. Cl. .............................. 476/10; 476/40; 476/42; 74/606 R
(58) Field of Search .................. 476/8, 10, 40, 476/41, 42, 46; 74/606 R; 184/6.12

(56) References Cited

U.S. PATENT DOCUMENTS 5,316,526 A * 5/1994 Fellows ..................... 476/40
5,820,510 A * 10/1998 Ueda et al. ................. 476/40
5,980,420 A * 11/1999 Sakamoto et al. ........... 476/10

FOREIGN PATENT DOCUMENTS

| DE | 34 18 552 | 11/1985 |
|---|---|---|
| EP | 0 172 276 | 2/1986 |
| FR | 937 893 | 8/1948 |
| GB | 1 428 882 | 3/1976 |
| GB | 2 319 571 | 5/1998 |
| JP | 6-159465 A * | 6/1994 |
| JP | 9-119506 * | 5/1997 |
| WO | WO 92/01175 | 1/1992 |

OTHER PUBLICATIONS

Marks' Standard Handbook for Mechanical Engineers, tenth edition, McGraw–Hill, 1996, isbn 0–07–004997–1, pp. 8–138 through 8–139.*

* cited by examiner

Primary Examiner—William C Joyce
(74) Attorney, Agent, or Firm—Nixon & Vanderhye P.C.

(57) ABSTRACT

Disclosed is a supply of hydraulic actuation and cooling fluid to the roller actuation pistons and rollers provided in an infinitely variable transmission. The transmission assembly (10) includes a split casing (12a, 12b) and a manifold (28) that comprises one or more channels (30, 32, 60) formed in a surface of the casing formed by the split. The provision of said manifold in this position allows for easier manufacture and better performance.

13 Claims, 6 Drawing Sheets

HYDRAULIC SUPPLY FOR INFINITELY VARIABLE TRANSMISSION

This is a continuation of PCT application CT/GB99/02968, filed Sep. 7, 1999, the entire content of which is hereby incorporated by reference in this application.

BACKGROUND OF THE INVENTION

1. Field of the Invention

The present invention relates to infinitely variable transmissions (IVT's) and relates particularly, but not exclusively, to the supply of hydraulic actuation and cooling fluids to the roller actuation pistons and rollers provided therein.

2. Discussion of Prior Art

Presently known IVT's, such as that disclosed in GB-A-2260583 comprise a pair of input disks and a pair of output disks mounted on a common axis X in order to define a pair of toroidal cavities in which are situated a plurality of variable position rollers employed to transmit motion between the input and the output disks. The rollers are hydraulically controlled by means of double acting hydraulic control pistons which employ the higher and the lower pressures within an associated hydraulic circuit to control the position of the rollers within the variator. In some arrangements, one roller within each toroidal cavity set forms the master roller and the remaining rollers are similarly provided with hydraulic fluid and form slave rollers, the orientation of which follows that of the master roller. In other arrangements two rollers within each cavity are employed as the master rollers. The master and slave rollers in each cavity are equi-spaced around an outer diameter in a manner well known in the art and shown in FIG. 2 of the present invention.

The supply of hydraulic fluid to the master and slave rollers presently requires the outer casing of the IVT to be provided with the various passages which must be precision cast, drilled, cross-drilled or otherwise machined. Alternatively, expensive and vulnerable external piping may be required.

In some applications it may be difficult to provide the complex network of hydraulic passages whilst meeting the desired cost, accuracy and performance requirements. Additionally, the friction losses within individual passages often varies depending on the length, surface finish and straightness of each passage. In some cases this could result in different pressure drops along the said passages and in different pressures being supplied to each roller control piston, thereby compromising the precision of the roller control system.

SUMMARY OF THE INVENTION

It is an object of the present invention to provide an IVT assembly which reduces and possibly eliminates the problems associated with the above-mentioned arrangement.

Accordingly, the present invention provides an IVT assembly comprising an outer casing and a plurality of hydraulically operated roller control pistons supplied with hydraulic fluid from a source thereof, via an hydraulic supply manifold, characterized in that said outer casing comprises a split casing and in which the supply manifold comprises a channel within a surface of the casing formed by said split.

Advantageously, the supply manifold comprises two channels, for carrying fluid at pressure, both of said channels being operably connected to one or more of said pistons for the supply of fluid thereto.

Preferably, the first, and the second pressure channels are radially displaced relative to each other.

Advantageously, the supply manifold further includes a lubrication channel, for supplying lubrication within the IVT.

Advantageously, the lubrication channel is radially outward of said first, and second channels.

In a preferred arrangement the IVT comprises two pairs of input and output disks. each pair having sandwiched therebetween a plurality of rollers operably connected to said hydraulically operated roller control pistons, in which the pistons of each input/output disk pair are paired for the purpose of hydraulic fluid supply with a corresponding piston for the other input/output disk pair.

In the particularly advantageous arrangements the pistons of one or more paired pistons are on opposite sides of said split line.

Advantageously the pistons of one or more paired pistons are equi-spaced from the split line, thereby to facilitate maintenance of substantially the same pressure drop within the manifold In one arrangement the manifold comprises channels formed in one or both of the faces formed by said split in the casing.

In an alternative arrangement the manifold comprises channels formed in just one of the faces formed by said split in the casing.

In certain arrangements, it might be desirable to include a sealing member, such as a gasket, between the faces of the casing.

Conveniently, one or more of the channels includes an extension portion extending into said casing and away from an associated surface thereof, thereby to connect said channel with an appropriate portion of the hydraulic control piston.

Conveniently, the longitudinal axes L of the pistons are angled at an angle θ relative to the plane P of the split in the casing.

BRIEF DESCRIPTION OF THE DRAWINGS

The present invention will now be more particularly described by way of example only with reference to the accompanying drawings, in which.

DETAILED DISCUSSION OF PREFERRED EMBODIMENTS

Figure 1:
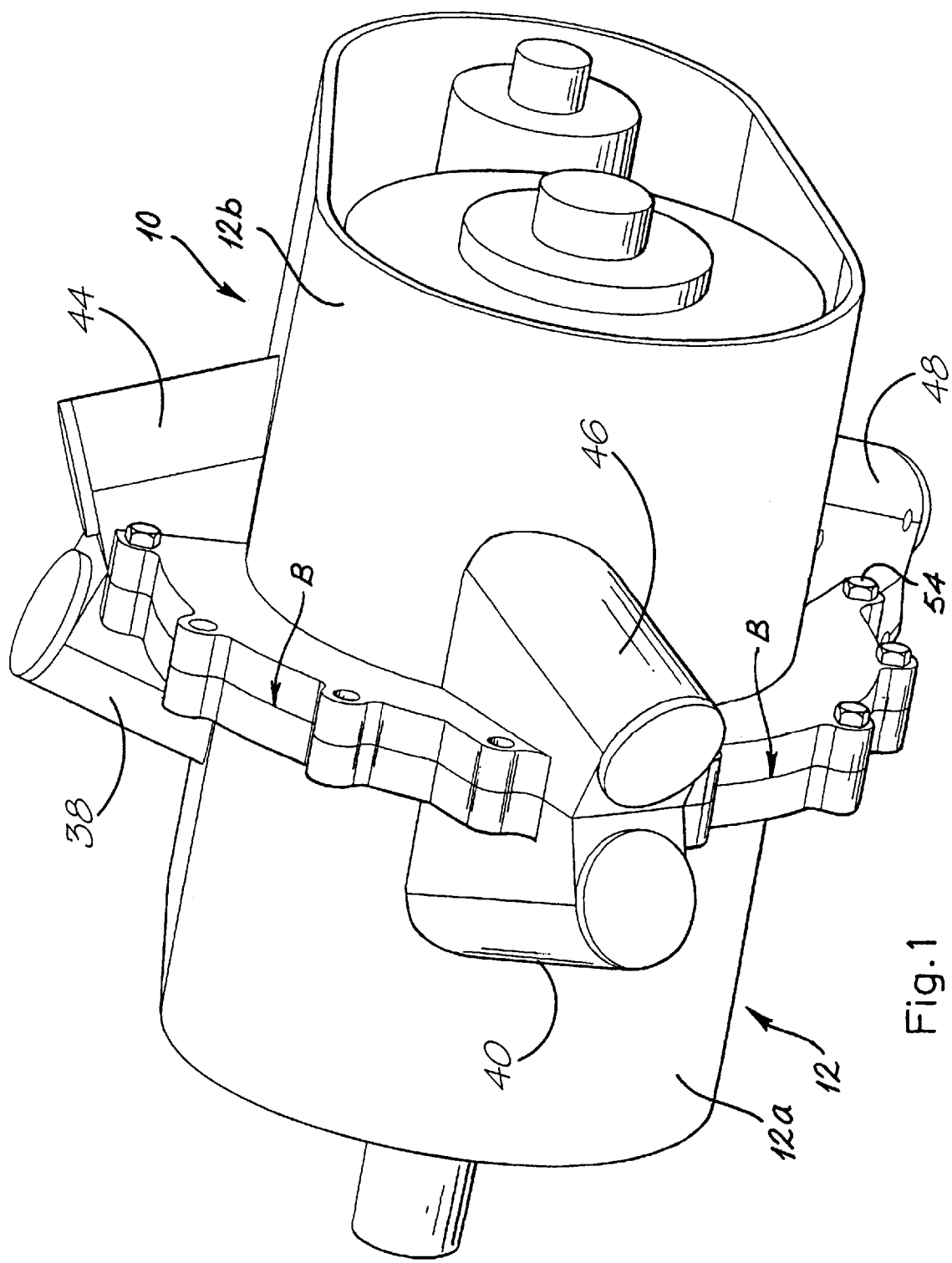
FIG. 1, is a part cut-away view of an IVT casing in accordance with the present invention.
Figure 2:
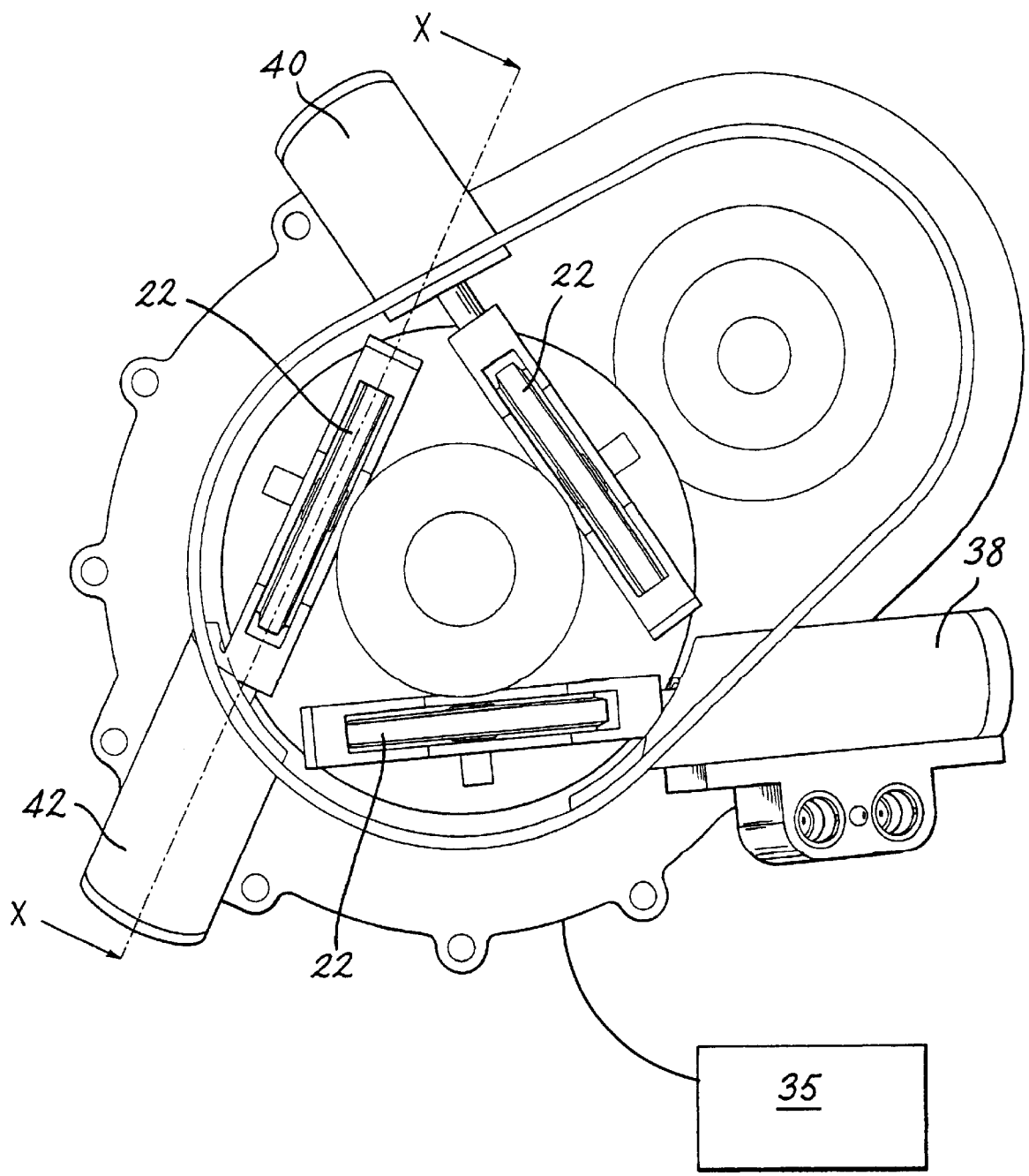
FIG. 2, is a cross-sectional view taken in the direction of arrows B—B in FIG. 1.
Figure 3:
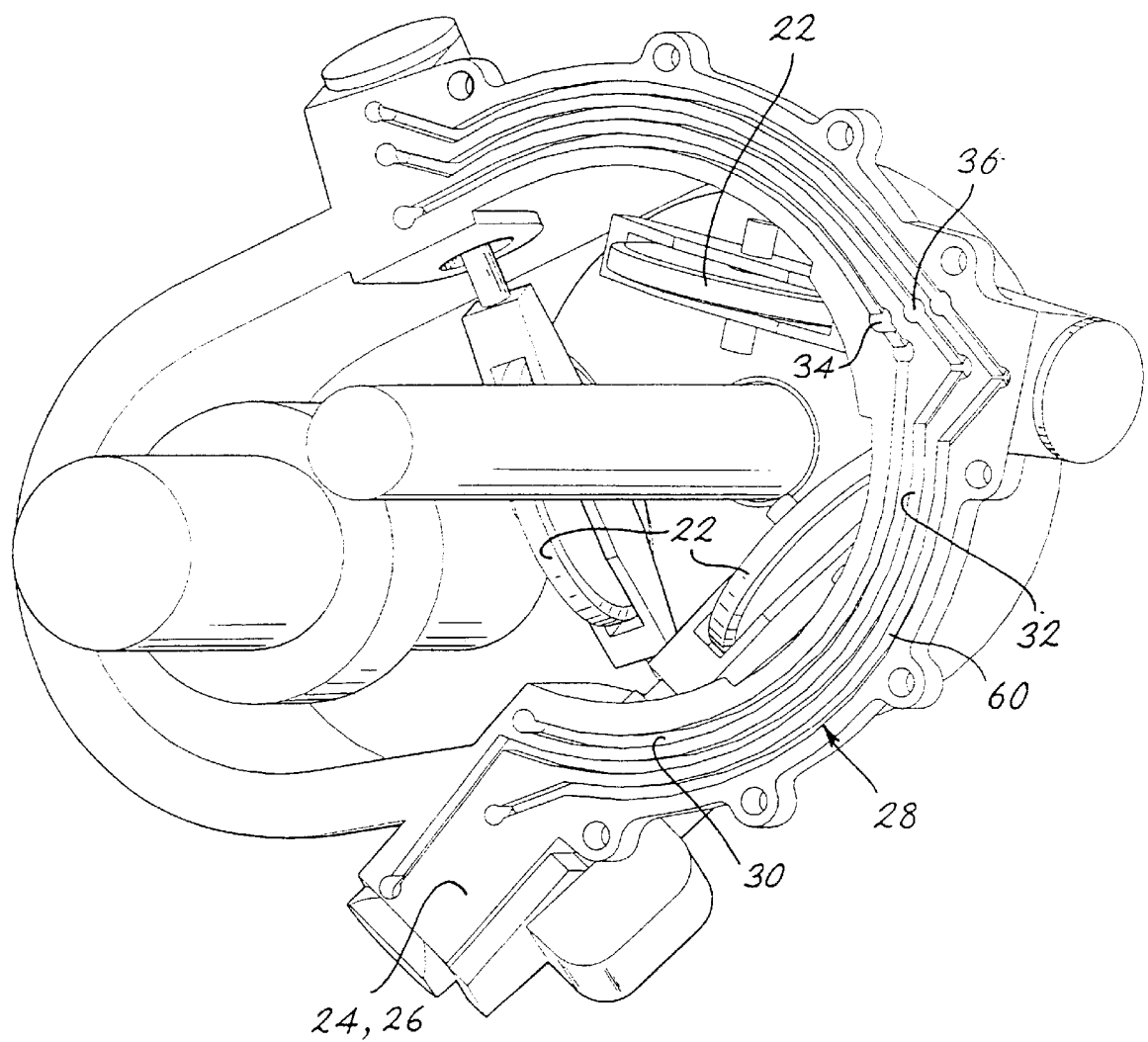
FIG. 3 is a perspective view of one half of the casing of the present invention.
Figure 4:
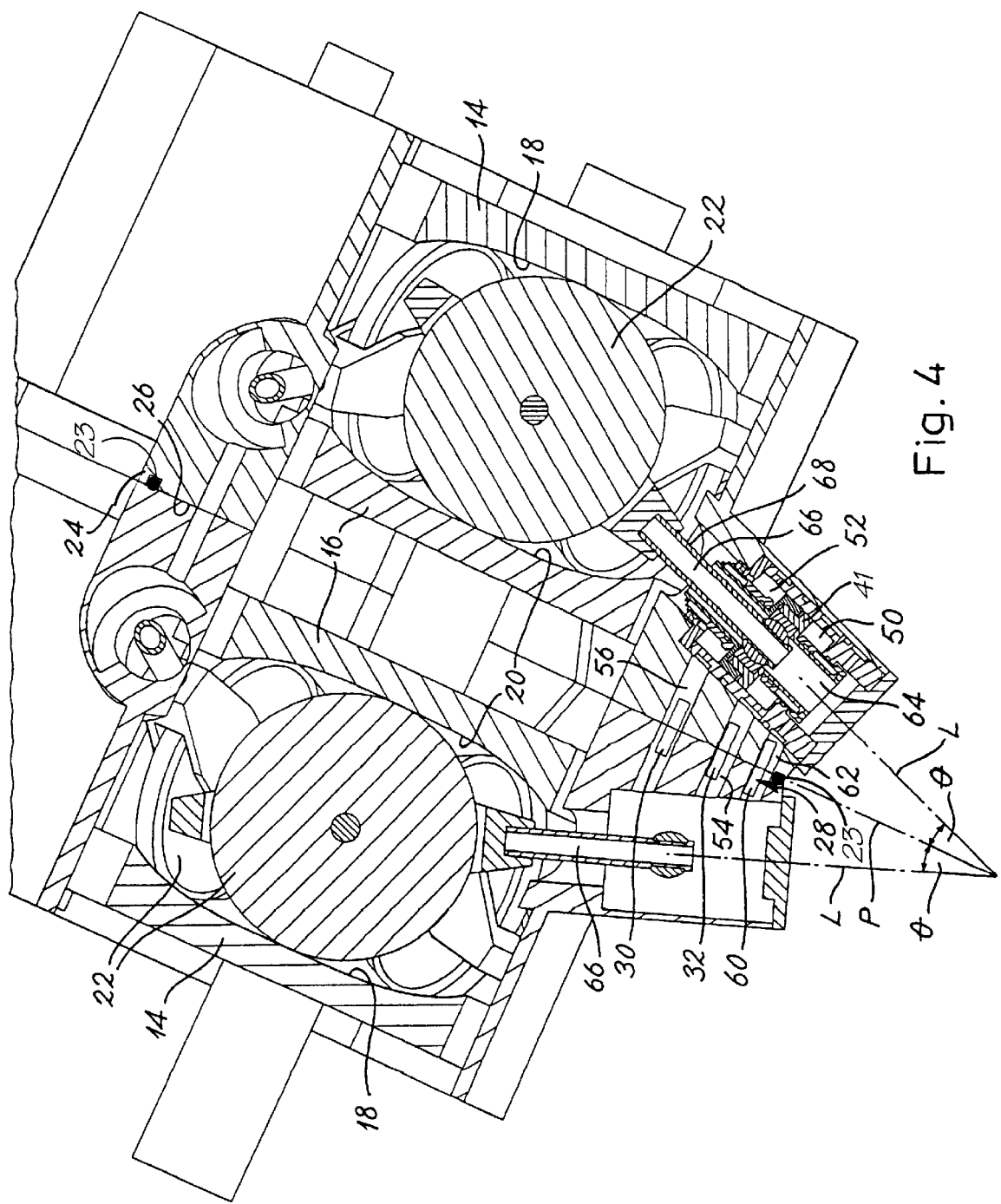
FIG. 4 is a detailed cross-sectional view, along the direction of arrows X—X in FIG. 2, of the twin piston/roller arrangements.

Turning now to the drawings in general, but more particularly to FIGS. 1 and 2, an infinitely variable transmission (IVT) 10 according to the present invention comprises an outer casing 12 having two portions 12a, 12b and matching pairs of input and output disks 14, 16, best seen in FIG. 4. The surfaces 18, 20 of the disks in each pair are profiled thereby to define a toroidal cavity therebetween and in which are situated a plurality of rollers 22, best seen in FIGS. 2, 3 and 4. Thus far the IVT is conventional except for the fact that the casing is split into two halves in a plane P which passes between the two output disks and which, in a preferred arrangement, divides the casing into two substantially equal portions 12a, 12b. The split line of the casing effectively forms two mutually confronting surfaces 24, 26 which are, in the present invention, used to form an hydraulic supply manifold shown generally at 28 and best seen in FIG. 3. The manifold 28 comprises two or more channels 30, 32 within one or more surfaces 24, 26 which, between them, form the hydraulic fluid supplies. In one example the channels 30, 32 may be cast into the surface of the casing 12. Alternatively, they may be formed by simply milling a slot in the surface in a manner well known to those skilled in the art and, therefore, not described herein. In either form, the channels 30, 32 effectively form a central manifold 28 into which hydraulic fluid is supplied by inlets 34, 36 under pressure from a source thereof, shown schematically at 35, and from which hydraulic fluid is taken to the master and slave pistons. One of the slave pistons can be seen at 41 in FIG. 4. Piston chambers receiving the slave pistons are defined within portions 40, 42, 46, 48 of the casing and piston chambers receiving the master pistons are defined in casing portions 38, 44. Conveniently, corresponding pistons of each side of the variator are arranged back-to-back as shown in FIGS. 1 and 4 such that the hydraulic fluids may be supplied to the appropriate piston chambers 50, 52 by means of simple drillings 54, 56 best seen in FIG. 4. Alternatively, where convenient the simple drillings may be replaced by a locally deepened section of the channel 30, 32 formed by, for example, plunge milling or formed in the original casting. By arranging the pistons close to the split line, as shown in FIG. 4, it will be possible to minimize the depth of the drilling and, thereby reduce the friction losses therealong. Additionally, the arrangement helps minimize the number of corners within the fluid supply and, hence, reduce the pressure losses within the supply. Further, it may be possible to make the channels 30, 32 somewhat larger in cross-section than presently known internally drilled passages, thereby reducing still further the friction and, hence, losses in the supply.

The two casing portions 12a, 12b of the above arrangement are bolted together by means of bolts 54 best seen in FIG. 1. Once bolted the surfaces 24, 26 mate up against each other to form a sealing surface which prevents the escape of hydraulic fluid from said manifold 28. In a preferred arrangement the channels 30, 32 are radially displaced relative to each other as shown and a significant sealing surface is provided therebetween, thereby to minimize the chance of any fluid escaping from the casing. In the event that pressurized fluid does escape from channel 30, it will be directed either inwardly towards the disks where it will be recirculated back to the sump (not shown) or outwardly towards the second pressure channel 32 which will receive it and prevent further escape. In such an event, the pressures within the channels will vary with time and, once detected, repair can be effected before a significant problem occurs.

In the arrangement of FIG. 4, the channels 30, 32 are formed on both surfaces 24 and 26. It will, however, be appreciated that the channels could be formed in just one surface or indeed on opposite surfaces, if so desired. In some arrangements it may be desirable to provide some form of a gasket or sealing member 23 between the two surfaces 22, 24.

If desired, the manifold might further include a lubrication channel 60 for supplying lubrication fluid to the rollers 22. This channel is conveniently formed in the same manner as described above in connection with channels 30, 32 and is preferably placed radially outward (outboard) of the other channels, as shown in FIGS. 3 and 4. Lubrication fluid is usually at a lower pressure than either of the other fluid supplies and this positioning of the lubrication channel 60 provides a further barrier against possible fluid escape from the other channels. As shown, the lubrication fluid is supplied to the manifold 60 and passed from the manifold to a drilling 62 and thence to a rear supply chamber 64. Chamber 64 feeds the roller 22 via a central supply duct 66 formed through the piston and the roll support arm 68.

Operation of the above arrangement is conventional in as much as hydraulic fluid is supplied under pressure to inlets 34, 36 and delivered to the appropriate piston chamber 50, 52 by means of the manifold 28. Some particular advantages of the present arrangement have already been highlighted herein. It is, however, worth noting that the present arrangement does provide a simple, easy to assemble and compact arrangement that reduces and possibly eliminates some of the problems associated with the prior art arrangements. Additionally the assembly is much simpler to machine than presently known arrangements. For example, one casing can be machined on a single machinery fixture employed for drilling/milling of holes and if necessary slits/channels as all of these operations would be perpendicular to faces 22, 24. The cylinder bores can also be machined on a single fixture having three jig positions rotatable 120° about the variator axis, thus ensuring better precision of manufacture.

Figure 5:
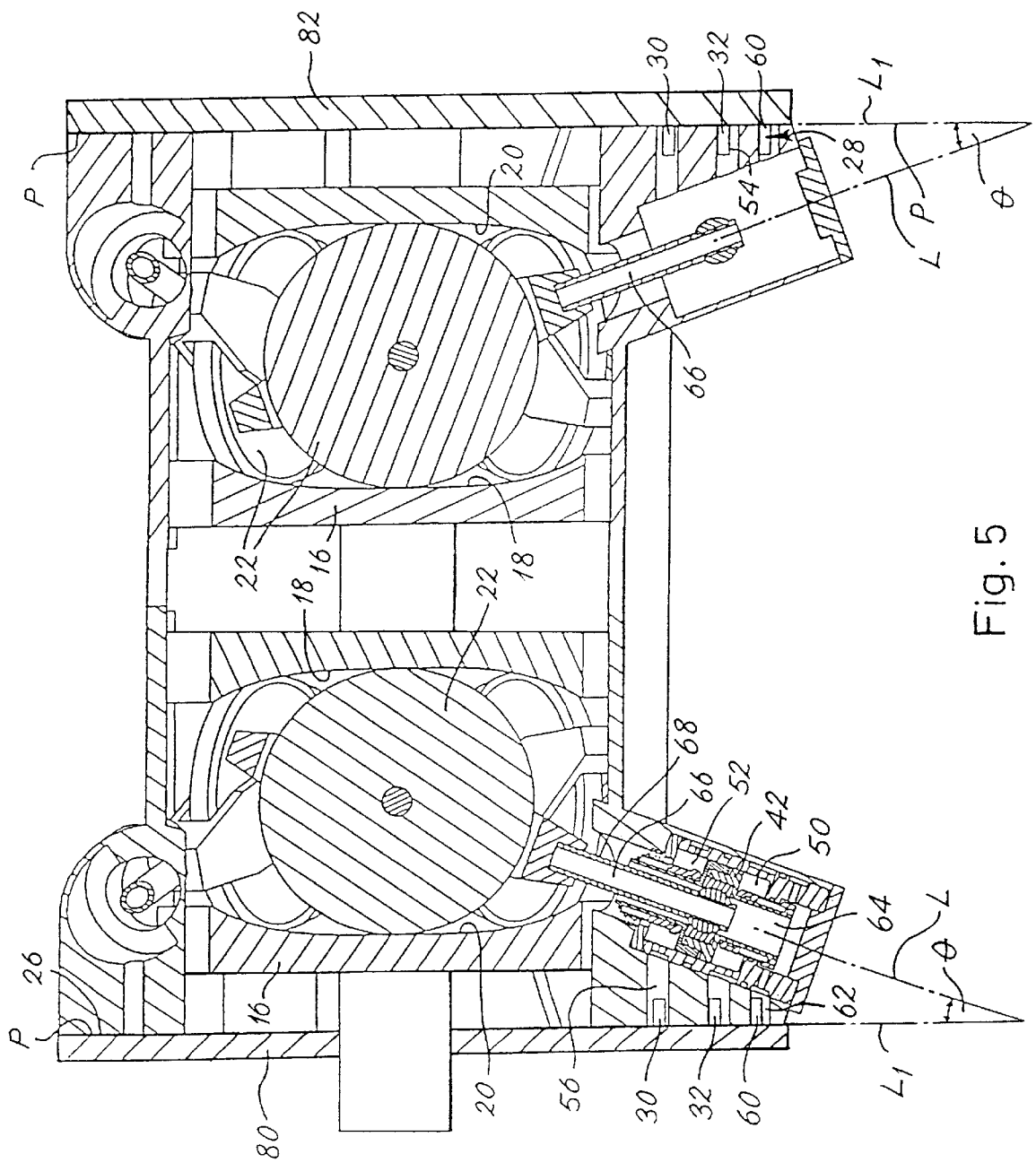
FIGS. 5 and 6 are cross-sectional views of alternative forms of the present invention.
Figure 6:
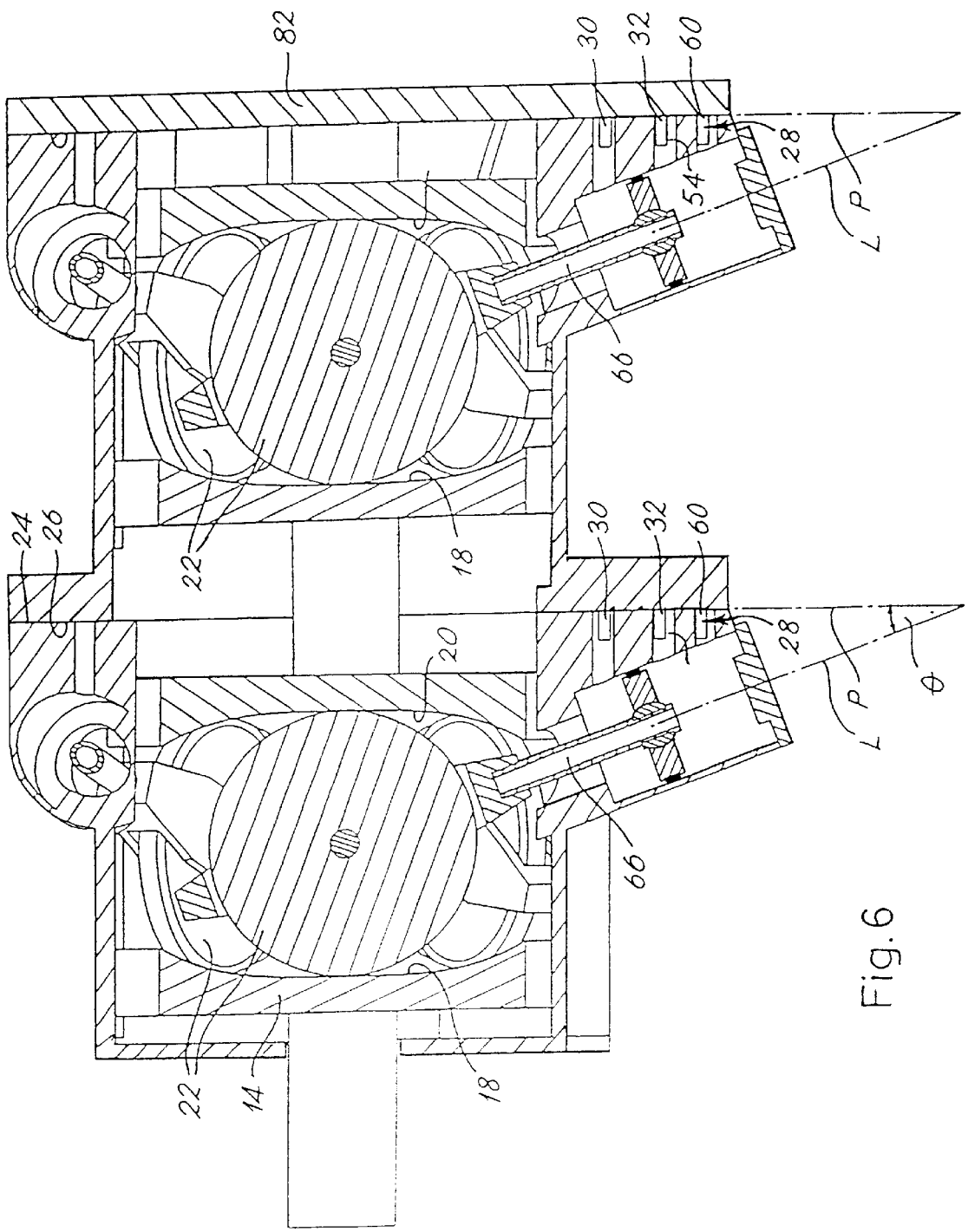

Alternative forms of the present invention are shown in FIGS. 5 and 6 from which it will be appreciated that the casing may be split in one or more of a number of different positions. For example, FIG. 5 illustrates an arrangement where the casing is split at two end positions and end plates 80, 82 seal the casing and manifold channels 30, 32, 60. The angular position of the roller assemblies remained angled relative to the split line as described above. However, in this arrangement, the split line comprises the line $L_1$ which lies in the plane P of the joint . Operation of this arrangement is substantially the same as disclosed in connection with the above embodiments with the exception of the fact that hydraulic fluid is now supplied to two manifolds rather than one. The further arrangement of FIG. 6 illustrates that the split line for one of the piston sets may be central to the actual casing whilst the split line for the second set of pistons may be at the end of the casino.

What is claimed is:

1. An infinitely variable transmission assembly comprising an outer casing, input and output discs mounted to the casing for rotation about a common axis, a plurality of variable position rollers to transmit motion between the input and output discs, each roller being acted on by one of a plurality of hydraulically operated roller control pistons supplied with hydraulic fluid from a source thereof via a hydraulic supply manifold, wherein said outer casing comprises a split casing, said casing having a plane of the split intersecting said axis and the supply manifold comprises a channel within a surface of the casing formed by said split, wherein the supply manifold comprises two channels, for carrying fluid at pressure, both of said channels being operably connected to one or more of said pistons for the supply of fluid thereto, and the first and the second pressure channels are radially displaced relative to each other with respect to said axis.

2. An assembly as claimed in claim 1 in which the supply manifold further includes a lubrication channel, for supplying lubrication within the infinitely variable transmission.

3. An assembly as claimed in claim 2 in which said lubrication channel is radially outward of said first and second channels with respect to said axis.

4. An assembly as claimed in claim 1 in which the infinitely variable transmission comprises two pairs of input and output disks, each pair having sandwiched therebetween a plurality of rollers operably connected to said hydraulically operated roller control pistons, in which each piston associated with one of the disk pairs is in fluid communication with a corresponding piston associated with the other disk pair to define a plurality of paired pistons.

5. An assembly as claimed in claim 1 in which the manifold comprises channels formed in one or both of the faces formed by said split in the casing.

6. An assembly as claimed in claim 5 and further including a sealing member between said faces.

7. An assembly as claimed in claim 1 in which the manifold comprises channels formed in just one of the faces formed by said split in the casing.

8. An assembly as claimed in claim 1 in which the channel includes an extension portion extending into said casing and away from an associated surface thereof, thereby to connect said channel with an appropriate portion of one of said hydraulic control pistons.

9. An assembly as claimed in claim 1 in which the pistons have a longitudinal axis inclined at an angle relative to the plane of the split in the casing.

10. An assembly as claimed in claim 1 in which said channel extends substantially circumferentially with respect to said axis to provide a communication path between roller control pistons.

11. An assembly as claimed in claim 1, comprising three rollers whose roller control pistons are equi-spaced around a diameter centered on said axis and communicate with each other through said channel, said channel extends substantially circumferentially with respect to the axis.

12. An infinitely variable transmission assembly comprising an outer casing, input and output discs mounted to the casing for rotation about a common axis, a plurality of variable position rollers to transmit motion between the input and output discs, each roller being acted on by one of a plurality of hydraulically operated roller control pistons supplied with hydraulic fluid from a source thereof via a hydraulic supply manifold, wherein said outer casing comprises a split casing, said casing having a plane of the split intersecting said axis and the supply manifold comprises a channel within a surface of the casing formed by said split, in which the infinitely variable transmission comprises two pairs of input and output disks, each pair having sandwiched therebetween a plurality of rollers operably connected to said hydraulically operated roller control pistons, in which each piston associated with one of the disk pairs is in fluid communication with a corresponding piston associated with the other disk pair to define a plurality of paired pistons, in which the pistons of at least one of the paired pistons are on opposite sides of said plane of said split.

13. An assembly as claimed in claim 12 in which the pistons of at least one of the paired pistons are equi-spaced from the split line.

* * * * *